W. SCHAAKE.
WIRE SUPPORTING STRUCTURE.
APPLICATION FILED SEPT. 17, 1920.
1,406,288.
Patented Feb. 14, 1922.
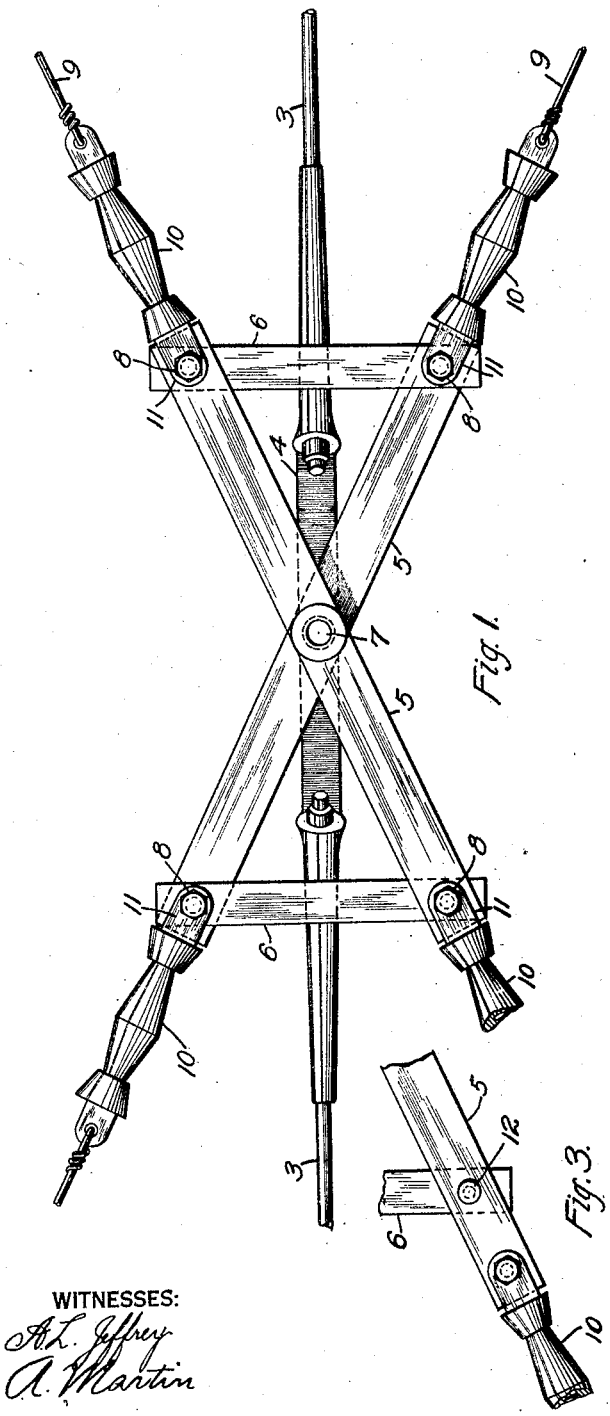
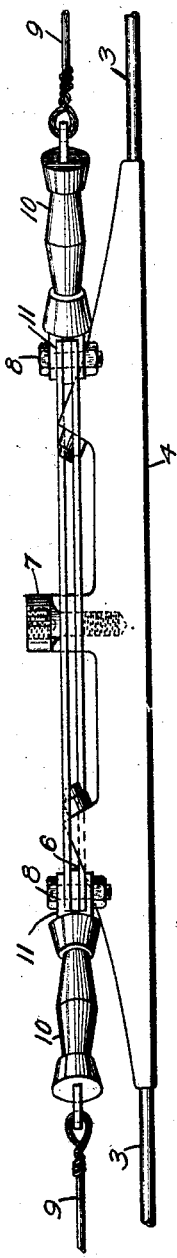
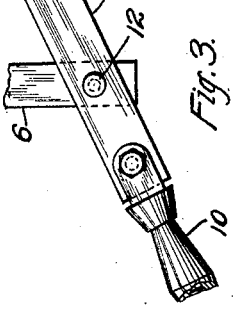
WITNESSES:
INVENTOR
William Schaake
BY
ATTORNEY

UNITED STATES PATENT OFFICE.

WILLIAM SCHAAKE, OF PITTSBURGH, PENNSYLVANIA, ASSIGNOR TO WESTINGHOUSE ELECTRIC & MANUFACTURING COMPANY, A CORPORATION OF PENNSYLVANIA.

WIRE-SUPPORTING STRUCTURE.

1,406,288.   Specification of Letters Patent.   Patented Feb. 14, 1922.

Application filed September 17, 1920. Serial No. 410,869.

*To all whom it may concern:*

Be it known that I, WILLIAM SCHAAKE, a citizen of the United States, and a resident of Pittsburgh, in the county of Allegheny and State of Pennsylvania, have invented a new and useful Improvement in Wire-Supporting Structures, of which the following is a specification.

My invention relates to strain supporting structures such as are used in maintaining trolley wires against displacement by longitudinal stresses, and it has for its object the provision of a simple, durable, and cheap construction which possesses all of the advantages of more complicated and expensive structures.

In the construction of trolley lines, the trolley wire is supported at intervals by diagonally-extending guy wires which take up the longitudinal strains. Various means have been devised for effecting connections between the guy wires and the trolley wire, to furnish proper support and still not interfere with the passage of the trolley harp. In many cases, the arrangement has been such that, if the trolley harp left the wire, it would be caught between the guy wires and the trolley wire, in the angle formed at their connecting point, and often tear down the line.

To overcome this objectionable feature, strain plates were devised to serve as connecting members between the guy wires and the trolley wire. The plate, at its middle, was secured to the trolley wire, and the guy wires terminated at the four corners of the plate, which corners were sufficiently distant from the trolley wire to prevent the trolley harp from catching between the guy wires and the trolley wire. The strain plates, although effective in operation, are unnecessarily expensive and too heavy.

By my structure, I secure the advantages incident to a strain plate, and eliminate the disadvantages thereof.

In the accompanying drawings—

Figure 1 is a plan view of one form of structure embodying my invention;

Fig. 2 is a view in side elevation of the arrangement of Fig. 1, and

Fig. 3 is a detail view of a modification of the invention.

In Fig. 1, I have shown a trolley wire 3 connected to a splice member 4 of any well known type. In order to maintain the splice member 4 and the wire against longitudinal movement, and to thereby avoid sagging of the trolley line, I provide a structure composed of a pair of diagonally-extending steel bars 5 and transverse steel bars 6. The diagonal bars are fastened to the splice member by means of a screw 7, which has its head tapped to receive an insulated suspension member carried on the usual transversely extending supporting wire, and the transverse bars are connected to the diagonal bars by means of bolts 8.

The framework formed by the bars is substantially rectangular in shape, and guy wires 9 are connected, through wood strain insulators 10 and clevises 11, to the four corners of the framework in the manner shown in Fig. 2. The guy wires, of course, have their outer ends connected to posts alongside the trolley track.

Instead of terminating the diagonal bars 5 at their points of engagement with the bars 6, they may be extended in the manner shown in Fig. 3 and secured to the bars 6 by rivets 12, to form a unitary structure. The strain insulators 10 would then be connected only to the bars 5.

It will be seen that the guy wires, acting through the supporting framework of the splicer, function in the ordinary manner. The spaces between the bars are small enough to prevent lodgment therein of the trolley harp, while, at the same time, the guy wires are spaced at such distance that the trolley harp will not become jammed between them and the trolley wire, as happens in cases where the guy wires are directly connected to a strain ear. The steel bar structure is much lighter and less expensive than the heavy iron rectangular plates heretofore used.

It will be apparent that various changes might be made in the arrangement of the supporting frame without departing from the spirit of the invention.

I claim:—

1. In a wire-supporting structure, the combination of a longitudinally-extending splice member, a pair of diagonally disposed bars connected intermediately of their ends to the splice member, a pair of transverse bars connecting the diagonal bars adjacent to the ends thereof, and means whereby guy wires are connected to said diagonal bars.

2. In a conductor-supporting device, the combination with guy wires arranged at acute angles with each other, of a conductor-supporting frame structure for connecting said guy wires and having portions for preventing a trolley harp approaching too close to the apices of said acute angles to thereby prevent the harp from becoming jammed between the guy wires.

3. A wire-supporting device comprising a plurality of straight bars arranged to form a horizontally disposed frame structure.

4. A wire-supporting structure composed of bars arranged to form a substantially horizontally disposed four-cornered frame, with means at each corner of said frame for connecting a guy wire thereto, and means intermediate its ends for supporting a trolley wire.

5. A conductor-supporting device comprising a plurality of bars arranged in the form of a horizontally disposed frame structure, conductor-holding means mounted at an intermediate position thereon and means at the intersections of said bars for attaching guy wires thereto.

6. A conductor-supporting device for suspension by angularly-related guy wires disposed in a horizontal plane comprising a plurality of connected bars extending in alignment with the guy wires, conductor-holding means thereon and means for attaching the guy wires thereto.

7. In a conductor-supporting structure, the combination with a conductor-holding member, of a pair of diagonally disposed bars connected intermediately of the ends thereof to the conductor-holding member, a pair of transverse bars connecting the diagonal bars adjacent to the ends thereof, and means for connecting guy wires to said diagonal bars.

In testimony whereof, I have hereunto subscribed my name this 7th day of September, 1920.

WILLIAM SCHAAKE.